United States Patent
Rasmussen et al.

(10) Patent No.: US 6,674,790 B1
(45) Date of Patent: Jan. 6, 2004

(54) SYSTEM AND METHOD EMPLOYING CONCATENATED SPREADING SEQUENCES TO PROVIDE DATA MODULATED SPREAD SIGNALS HAVING INCREASED DATA RATES WITH EXTENDED MULTI-PATH DELAY SPREAD

(75) Inventors: Donald J. Rasmussen, Fort Wayne, IN (US); Larry W. Koos, Sanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 45 days.

(21) Appl. No.: 10/053,695

(22) Filed: Jan. 24, 2002

(51) Int. Cl.⁷ .............................................. H04B 1/707
(52) U.S. Cl. ..................... 375/146; 375/142; 375/150
(58) Field of Search ................................. 375/141, 144, 375/146, 148, 142, 150; 370/209, 320, 335, 342

(56) References Cited

U.S. PATENT DOCUMENTS

| | | | |
|---|---|---|---|
| 4,494,192 A | 1/1985 | Lew et al. ................. 364/200 |
| 4,617,656 A | 10/1986 | Kobayashi et al. ........... 370/74 |
| 4,736,371 A | 4/1988 | Tejima et al. ............... 370/95 |
| 4,742,357 A | 5/1988 | Rackley ..................... 342/457 |
| 4,747,130 A | 5/1988 | Ho ........................... 379/269 |
| 4,910,521 A | 3/1990 | Mellon ....................... 342/45 |
| 5,034,961 A | 7/1991 | Adams ....................... 375/130 |
| 5,068,916 A | 11/1991 | Harrison et al. ............. 455/39 |
| 5,231,634 A | 7/1993 | Giles et al. ................ 370/95.1 |
| 5,233,604 A | 8/1993 | Ahmadi et al. ............... 370/60 |
| 5,241,542 A | 8/1993 | Natarajan et al. ........... 370/95.3 |
| 5,317,566 A | 5/1994 | Joshi .......................... 370/60 |
| 5,392,450 A | 2/1995 | Nossen ....................... 455/12.1 |
| 5,412,654 A | 5/1995 | Perkins ...................... 370/94.1 |
| 5,424,747 A | 6/1995 | Chazelas ..................... 342/70 |
| 5,502,722 A | 3/1996 | Fulghum ..................... 370/69.1 |
| 5,517,491 A | 5/1996 | Nanni et al. ................... 370/29 |
| 5,555,425 A | 9/1996 | Zeller et al. ................ 395/800 |
| 5,555,540 A | 9/1996 | Radke ........................ 370/16.1 |
| 5,572,528 A | 11/1996 | Shuen ....................... 370/85.13 |
| 5,602,833 A | * 2/1997 | Zehavi ........................ 370/209 |
| 5,615,212 A | 3/1997 | Ruszczyk et al. ........... 370/433 |
| 5,618,045 A | 4/1997 | Kagan et al. ................. 463/40 |
| 5,621,732 A | 4/1997 | Osawa ......................... 370/79 |
| 5,623,495 A | 4/1997 | Eng et al. ................... 370/397 |

(List continued on next page.)

FOREIGN PATENT DOCUMENTS

| | | |
|---|---|---|
| CA | 2132180 | 3/1996 |
| EP | 0513841 A3 | 11/1992 |
| EP | 0513841 A2 | 11/1992 |

(List continued on next page.)

OTHER PUBLICATIONS

Wong et al., "A Pattern Recognition System for Handoff Algorithms", Jul. 2000, IEEE Journal on Selected Areas in Communications, vol. 18, No. 7.

(List continued on next page.)

*Primary Examiner*—Young T. Tse
(74) *Attorney, Agent, or Firm*—Roylance, Abrams, Berdo & Goodman, L.L.P.; Joseph J. Buczynski

(57) ABSTRACT

A system and method for enabling a transmitter employing signal spreading techniques to increase the data rate of the transmitted modulated signal without reducing the multi-path delay spread. Specifically, the system and method use concatenated spreading sequences to provide data modulated spread signals having increased data rates with extended multi-path delay spread. The system and method therefore removes the one-to-one relationship between the repetitive spreading code length and maximum multi-path delay spread of a data modulated spread signal, to thus increase the data rate for a given multi-path delay spread while preserving the autocorrelation and cross-correlation properties of the individual spreading sequences.

14 Claims, 11 Drawing Sheets

U.S. PATENT DOCUMENTS

| | | | |
|---|---|---|---|
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,703,902 A * | 12/1997 | Ziv et al. | 375/228 |
| 5,706,428 A | 1/1998 | Boer et al. | 395/200 |
| 5,717,689 A | 2/1998 | Ayanoglu | 370/349 |
| 5,742,678 A * | 4/1998 | Dent et al. | 380/270 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,128,332 A * | 10/2000 | Fukawa et al. | 375/146 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 2001/0053699 A1 | 12/2001 | McCrady et al. | 455/513 |

FOREIGN PATENT DOCUMENTS

| | | |
|---|---|---|
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self–Organizing, Sef–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link-State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Martha E. Steenstrup, "Dynamic Multipoint Virtual Circuits for Multimedia Traffic in Multihop Mobile Wireless Networks".

Zhenyu Tang and J.J. Garcia–Luna–Aceves, "Collision-Avoidance Transmission Scheduling for Ad–Hoc Networks".

George Vardakas and Wendell Kishaba, "QoS Networking With Adaptive Link Control and Tactical Multi–Channel Software Radios".

* cited by examiner

FIG. 10

SYSTEM AND METHOD EMPLOYING CONCATENATED SPREADING SEQUENCES TO PROVIDE DATA MODULATED SPREAD SIGNALS HAVING INCREASED DATA RATES WITH EXTENDED MULTI-PATH DELAY SPREAD

BACKGROUND OF THE INVENTION

1. Field of the Invention

The present invention relates to a system and method employing concatenated spreading sequences to provide data modulated spread signals having increased data rates with extended multi-path delay spread. More particularly, the present invention relates to a system and method employing concatenated spreading sequences to remove the one-to-one relationship between the repetitive spreading code length and maximum multi-path delay spread of a data modulated spread signal, to thus increase the data rate for a given multi-path delay spread while preserving the autocorrelation and cross-correlation properties of the individual spreading sequences.

2. Description of the Related Art

Many communications systems, such as wireless terrestrial or satellite-based communications networks, often employ spread spectrum modulation techniques to render the communications signals less susceptible to noise, interference, and multi-path channel effects. As can be appreciated by one skilled in the art, a transmitter employing a spread spectrum technique typically uses a sequential noise-like signal structure, such as pseudonoise (PN) codes, to spread a normally narrow-band information signal over a relatively wide-band of frequencies during transmission. A receiver despreads the signal to retrieve the original information signal by correlating the received spread spectrum signal with the known PN code waveform.

Known spreading techniques typically use a single repetitive spreading sequence to spread the data being transmitted, which results in a one-to-one relationship between the spread code length and maximum multi-path delay spread. A single repetitive spreading sequence is typically used for the synchronization section of the waveform to reduce hardware complexity introduced by the sliding matched filter implementations. To preserve the autocorrelation properties of the spreading code, a single data symbol is spread across an entire non-repetitive section of the spreading code, which limits the maximum data rate to the required multi-path delay spread for the system. The data symbol consists of 1 bit for biphase shift keying (BPSK) data modulation, 2 bits for quadrature phase shift keying (QPSK) modulation, and M bits for higher bit modulation formats.

FIG. 1 illustrates an example of a 128 chip repetitive spreading sequence, identified as "spreading code 1", including chips c1(1) through c1(128), being modulated by a data stream including data symbols D1 through D4, to provide a multi-path delay spread of ±128 chips. This modulation limits the data symbol period to 128 chips for spreading across one repetitive section of the spreading code. As indicated, the modulation produces a direct path signal, including modulated symbols D1*c1(1) through D1*c1(128), D2*c1(1) through D2*c1(128), and so on. FIG. 1 further illustrates the relationship between this direct signal path and a multi-path signal generated by the communications channel that is delayed by 31 chips with respect to the direct path signal.

As further illustrated, the received signal is the combination of the direct and multi-path signal, which introduces both constructive and destructive chip interference. An example of the effect of constructive and destructive chip interferences is also illustrated for BPSK data symbols of +1 and −1. Similar constructive and destructive chip interference exists for higher modulation formats. Since interference exists on a chip level versus a symbol level, spreading sequences with good autocorrelation properties (i.e., low sidelobe levels) are able to recover the original signal. Accordingly, by using a Rake receiver, a receiver is able to recover both the direct and multi-path signal by despreading with two properly time aligned spreading sequence structure as shown in FIG. 2.

It is further noted that the delay between the multi-path signal and the direct path signal can be increased to, for example, 128 chips, as shown in FIG. 3. The received signal resulting from this relationship is also shown in FIG. 3. As indicated, instead of the multi-path signal introducing chip interference, symbol interference is introduced by this chip delay. That is, because the multi-path signal is delayed by 128 chips, the receiver receives the modulated symbols D1*c1(1) through D1*c1(128) of the multi-path signal at the same moments in time that it receives the modulated symbols D2*c1(1) through D2*c1(128) of the direct path signal. Likewise, the receiver receives the modulated symbols D2*c1(1) through D2*c1(128) of the multi-path signal at the same moments in time that it receives the modulated symbols D3*c1(1) through D3*c1(128) of the direct path signal, and so on.

As further indicated in FIG. 3 for BPSK data modulation, if the symbols D1 and D2, for example, are equal, then the received signal experiences constructive symbol interference between the modulated symbols D1 and D2 which are received at the same moments of time as discussed above. However, if the symbol D1 is equal to −D2, for example, then the received signal experiences destructive symbol interference between the modulated symbols D1 and D2. Both the constructive and destructive symbol interference extends across an entire repetitive spreading sequence as indicated. If destructive interference of the type described above occurs, recovery of the symbols is impossible, because the destructive interference reduces the symbol information to zero. However, it can be appreciated that if the multi-path delay is increased beyond 128 chips, the recovery of data symbols is again possible, because only chip interference, not symbol interference occurs. Similar constructive and destructive symbol interference exists for higher modulation formats.

In order to prevent the potentially disastrous affects caused by destructive interference, it is typical for know systems to limit the multi-path delay spread to the maximum length of the spreading code. Hence, if a multi-path delay spread of 128 chips is desired, the maximum data period is also limited to less than 128 chips. In this event, in order to double the data rate without changing the modulation format, it is necessary to reduce the data period to 64 chips. Since the multi-path delay spread is related to the data period by a one-to-one ratio, the multi-path delay spread would also have to be decreased to less than 64 chips.

Accordingly, a need exists for a system and method which enables a transmitter employing signal spreading techniques to increase the data rate of the transmitted modulated signal without reducing the multi-path delay spread significantly.

SUMMARY OF THE INVENTION

An object of the present invention is to enable a transmitter employing signal spreading techniques to increase the data rate of the transmitted modulated signal without reducing the multi-path delay spread.

Another object of the present invention is to enable a transmitter employing signal spreading techniques to increase the data rate for a given multi-path delay spread while preserving the autocorrelation and cross-correlation properties of the individual spreading sequences at which the data symbols are spread.

Another object of the present invention is to enable a receiver to employ a Rake receiver structure to enhance multi-path performance.

These and other objects are substantially achieved by providing a system and method for spreading a modulated data sequence using concatenated spreading sequences. The system and method enables a transmitter to generate spreading code sequences, and to create a plurality of concatenated spreading sequences, each comprising a plurality of the spreading code sequences concatenated together and having a length no greater than a predetermined maximum length. The transmitter then spreads each of the data symbols with one of the respective concatenated spreading sequences to produce a modulated signal, representing the direct path signal at the receiver. The system and method further enable the receiver to despread the direct path and multi-path signals using an a priori knowledge of the concatenated spreading sequences in combination with a RAKE architecture which despreads each multi-path RAKE tap. Accordingly, the system and method removes the one-to-one relationship between the repetitive spreading code length and maximum multi-path delay spread of a data modulated spread signal, to thus increase the data rate for a given multi-path delay spread and modulation format while preserving the autocorrelation and cross-correlation properties of the individual spreading sequences.

BRIEF DESCRIPTION OF THE DRAWINGS

These and other objects, advantages and novel features of the invention will be more readily appreciated from the following detailed description when read in conjunction with the accompanying drawings, in which:

FIG. 10 is a signal diagram illustrating an example of a signal spreading sequence including concatenated sequences for spreading a data signal in accordance with an embodiment of the present invention, and an example of the manner in which the concatenated sequences can be used to double and quadruple the data rate according to an embodiment of the present invention without changing the data modulation format.

DETAILED DESCRIPTION OF THE PREFERRED EMBODIMENTS

Figure 4:
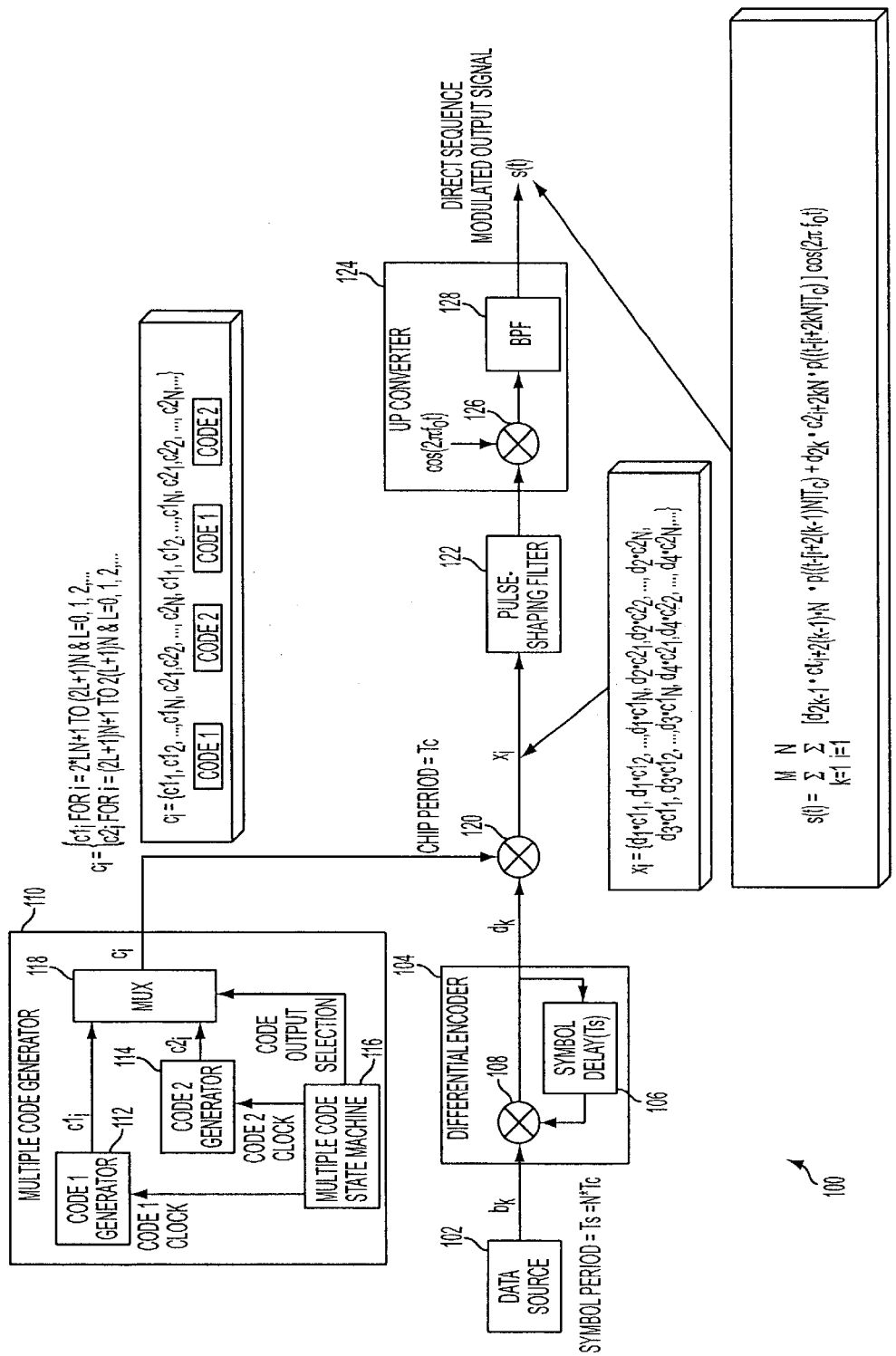
FIG. 4 is a conceptual block diagram illustrating an example of a system for spreading a DBPSK data modulated signal using concatenated spreading sequences according to an embodiment of the present invention.

FIG. 4 is a conceptual block diagram illustrating an example of system 100 that can be employed in a transmitter to perform a data signal spreading technique according to an embodiment of the present invention. For example, system 100 can be employed in a transmitter of user terminals, fixed routers and access points of an ad-hoc network as described in U.S. patent application Ser. No. 09/897,790 entitled "Ad Hoc Peer-to-Peer Mobile Radio Access System Interfaced to the PSTN and Cellular Networks ", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel ", filed on Mar. 22, 2001, the entire content of both of said patent applications being incorporated herein by reference.

As illustrated, the system 100 includes a data source 102 which provides the data to be transmitted. The data is provided to a differential encoder 104 that includes a symbol delay device 106 and a multiplier 108, the operations of which can be readily appreciated by one skilled in the art.

The differential encoder 104 therefore outputs data symbols D1, D2, D3 and so on, which takes on values of either +1 or −1 each symbol period, similar to those discussed in the Background section above. The differential encoder is chosen because it is used typically in mobile communications due to its robustness to channel imperfections. A coherent system is easily provided by removing the differential detector; $d_k$ is then equal to $b_k$, which takes on values of either +1 or −1 each symbol period.

System 100 further includes a code generator 110 that includes a plurality of code generators 112 and 114 which receive clock signals from a multiple code state machine 116 and, in response, output respective spreading codes. The spreading codes output by code generators 112 and 114 are input to a multiplexer 118 which, under the control of a code output selection signal provided by multiple code state machine 116, outputs a spreading code sequence $c_i$. The spreading code sequence $c_i$ consists of concatenated spreading code sequences, which takes on values of either +1 or −1 each chip period.

Figure 5:
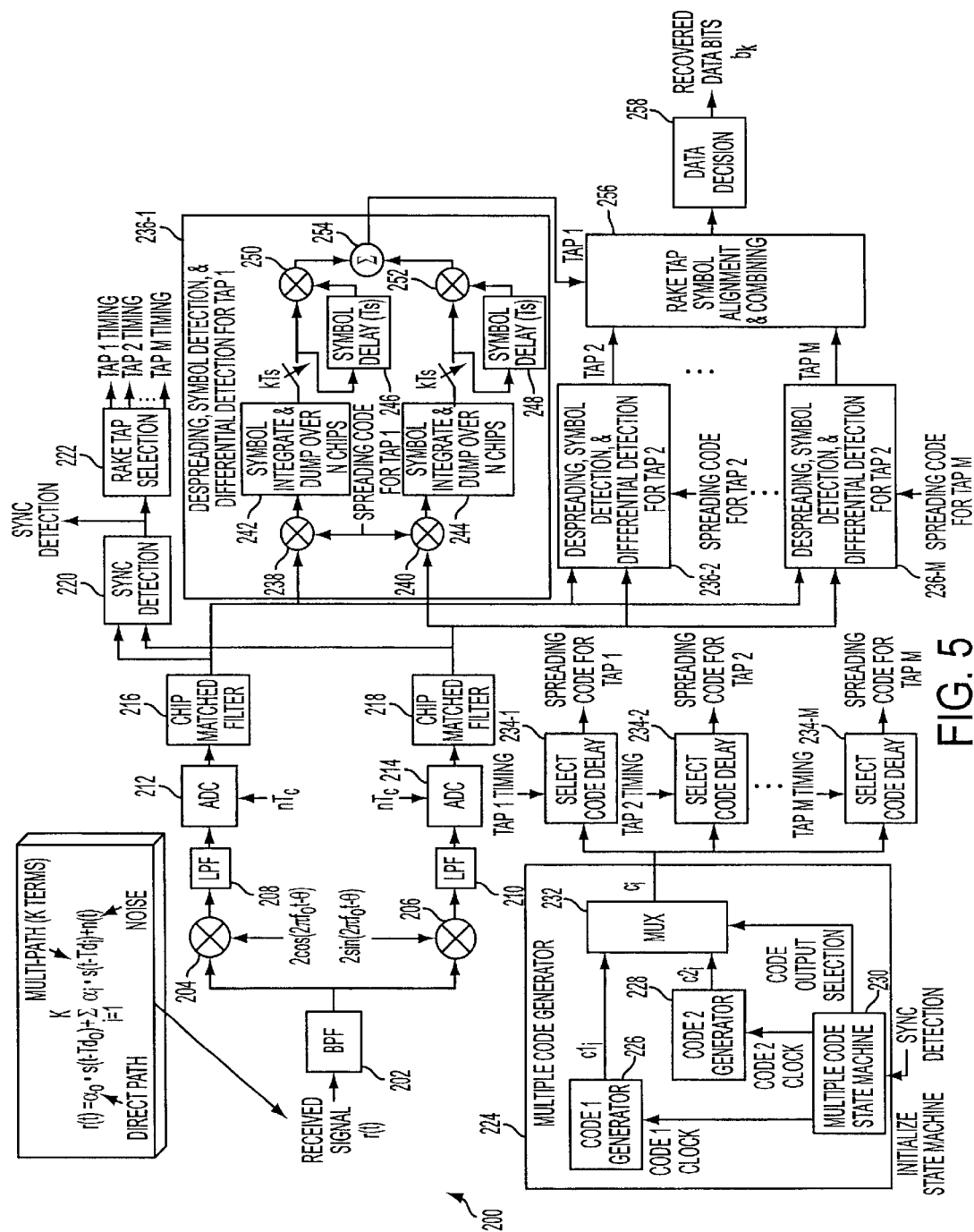
FIG. 5 is a conceptual block diagram illustrating an example of a system for despreading and demodulating a DBPSK data modulated signal as spread by the system shown in FIG. 4 according to an embodiment of the present invention.

The data symbols D1, D2 and so on output by differential encoder 114, are spread by the spreading code sequence $c_i$, using the multiplier 120 which outputs the spread data sequence as indicated. In this example, the spread data symbols are provided to a pulse shaping filter 122. The output of the pulse shaping filter 122 is then provided to an up converter 124 which includes a multiplier 126 and band pass filter (BPF) 128. The multiplier 126 multiplies the output of the pulse shaping filter by the carrier signal represented by $\cos(2\pi f_0 t)$, with $f_0$ representing the channel carrier frequency. The details and operations of the pulse shaping filter 122 and up converter 124 can be readily appreciated by one skilled in the art. FIG. 4 shows the up conversion process as a single direct conversion from baseband to the carrier frequency. This up conversion process can be easily implemented using multiple IF conversions without impacting the concatenated spreading sequences approach. Similarly, the pulse-shaping filter can be implemented using an analog or digital approach without impacting the concatenated spreading sequence approach. The up converter 124 outputs the direct sequence modulated output signal, which includes the spreading code sequence modulated by the data symbol sequence in a manner discussed above. This direct sequence modulated output signal will be sent through a communications channel to a receiver 200, as shown in FIG. 5. The communications channel can introduce multi-path signals, which will be combined with the direct path at the receiver 200.

As indicated, the direct path and multi-path signals are shown as the received signal represented by the symbol r(t). The received signal r(t) is first filtered with a band pass filter 202, and then down converted using a quadrature mixer consisting of the two multipliers 204 and 206, which multiply the filtered signal by $2^*\cos(2\pi f_0 t - \theta)$ and $2^*\sin(2\pi f_0 t - \theta)$, respectively, with $f_0$ representing the channel carrier frequency and $\theta$ representing the phase error between the transmitter and receiver carrier frequency. FIG. 5 shows the down conversion process as a single direct conversion from RF to baseband. For one skilled in the art, this single direct conversion can be implemented using multiple IF conversions without impacting the concatenated spreading sequences despread approach. The respective outputs of multipliers 204 and 206 are filtered by low pass filters 208 and 210 to remove spurious signals from the mixing operation and reduce the noise level. The filtered inphase (cosine mixer side) and quadrature (sine mixer side) outputs are provided to the respective analog to digital converters (ADC) 212 and 214 whose sampling time is equal to a multiple of the chip period. FIG. 5 shows the ADC sampling clock being equal to the chip rate (nTc). The outputs of the ADCs 212 and 214 are then provided to respective chip matched filters 216 and 218, which are matched to the chip pulse-shaping filter response to maximize the signal-to-noise ratio. FIG. 5 shows the chip matched filters being implemented digital, where the preceding band pass filter (BPF) and low pass filters (LPFs) are wider bandwidth filters than the chip matched filter to minimize degradation in the signal level. For one skilled in the art, the chip matched filter can be implement using an analog design or a combination of an analog and digital design.

The outputs of the chip matched filters 216 and 218 are provided to a synchronization detector 220 that detects the synchronization point at which the receiver is chip, symbol, and frame time aligned with the received signal. An a priori knowledge of the sync sequence pattern is used to synchronize the receiver to the received signal. This synchronization point sets the time zero in the receiver with respect to the received signal. The sync sequence can take advantage of using concatenated spreading code sequences to modulate and demodulate the sync symbols using similar approach discussed for the data. Rapid sync acquisition required for high data rate wireless communications drives the despreading operation of the sync sequence to a sliding correlation operation implemented with a digital matched filter versus a correlator implementation (spreading code despreader using a multiplier followed by a symbol integrate and dump operation) used by the data detection shown in FIG. 5. For one skilled in the art, the detection of the sync sequence is typically broken down to a coherent processing section which implements a digital matched filter for a known repetitive spreading sequence followed by a noncoherent symbol processing section which can be implemented using a digital matched filter or correlator implementation depending on the sync waveform design.

Using concatenated spreading sequences for the coherent processing section requires a digital matched filter for each spreading sequence. The establishment of the sync detection point enables the receiver to define the start of a multi-path window in which the a priori knowledge of the sync sequence pattern is observed to determine if delayed versions of the sync sequence pattern are detected. Multi-path signals before the sync point can be also detected by providing memory of correlation signal levels before the sync detection point. The Rake Tap Selection 222 time tags each of the detected multi-path delay with respect to the sync point along with the corresponding signal correlation levels. Signal correlation levels that exceed a multi-path threshold level are considered to be valid multi-path taps. Valid multi-path taps are order from maximum to minimum signal correlation levels to establish the priority measure of each tap selection. The tap with the largest signal correlation level is given the highest priority followed by the tap with the next largest signal correlation level, and so on down to the lowest priority tap with the smallest signal correlation level. As shown in FIG. 5, at most M tap selections with the highest priority are provided to the Rake demodulator architecture for proper time alignment of the despreading concatenated spreading sequences with the detected received signal delays corresponding to Rake demodulator taps defined by Tap 1, Tap 2, . . . to Tap M.

Specifically, as further indicated in FIG. 5, the receiver 200 includes a multiple code generator 224 that provides the same concatenated spreading sequences as that produced by the code generator 10 discussed above. That is, code generator 224 includes a plurality of code generators 226 and 228 which receive clock signals from a multiple code state machine 230 that is initialized by the sync detection signal output by the synchronization detector 220, and in response, output respective spreading codes. The spreading codes output by code generators 224 and 226 are input to a multiplexer 232, which under the control of a code output selection signal provided by multiple code state machine 230, outputs a spreading code sequence $c_i$. The spreading code sequence $c_i$ consists of concatenated spreading code sequences, which takes on values of either +1 or −1 each chip period. The proper start of the multiple code generator used to provide the concatenated spreading code sequences for despreading is determine from the sync detection, which properly times aligns the received signal and receiver despreading operation.

The spreading code sequence $c_i$ output from the multiplexer 232 is input to a plurality of select code delay circuits 234-1, 234-2 . . . 234-M. Tap 1 through Tap M timing signals select the proper time delay for the spreading code for each of the corresponding tap elements of the Rake demodulator.

The receiver 200 further includes a plurality of despreading/symbol detection/differential detection circuits 236-1 through 236-M as shown to differentially demodulate the symbol sequence for each Rake Tap 1 through M. FIG. 5 shows a DBPSK Rake architecture used to enhance performance in a multi-path environment. For one skilled in the art, the DBPSK Rake architecture can be replaced with different Rake architectures such as a maximum ratio combiner architecture without impacting the system enhancements offered by using the concatenated spreading sequences.

The outputs of the chip matched filters 216 and 218 are provided to each of the despreading/symbol detection/differential detection circuits 236-1 through 236-M. As indicated for circuit 236-1, each despreading/symbol detection/differential detection circuit 236-1 through 236-M includes a plurality of multipliers 238 and 240. Multiplier 238 of despreading/symbol detection/differential detection 236-1 multiplies the output of chip matched filter 216 with the spreading code for Tap 1 output by select code delay circuit 234-1, and multiplier 240 multiplies the output of chip matched filter 218 with the spreading code for Tap 1 output by select code delay circuit 234-1. It should be noted that multiplier 238 of despreading/symbol detection/ differential detection 236-2 multiplies the output of chip matched filter 216 with the spreading code for Tap 2 output by select code delay circuit 234-2, and multiplier 240 multiplies the output of chip matched filter 218 with the spreading code for Tap 2 output by select code delay circuit 234-2, and so on for circuits 236-3 through 236-M. Multiplier 238 despreads the inphase chip matched filtered signal for each of the respective taps. Multiplier 240 despreads the quadrature chip matched filtered signal for each of the respective taps. The inphase and quadrature signal despreading is required for the noncoherent receiver design shown in FIG. 5. For a coherent receiver design, the phase term θ shown in FIG. 5 goes to zero and only an inphase despreading operation is required for a BPSK modulated signal. An inphase and quadrature despreading operation is required for a coherent system using quadrature modulation signals, such as QPSK, OQPSK, and MSK for example.

Each circuit 236-1 through 236-M further includes a plurality of symbol integrate & dump circuits 242 and 244 which integrate the depread signal outputs of multipliers 238 and 240 over each symbol period, respectively, as shown explicitly for circuit 236-1. The number of chips integrated by the integrate & dump circuits 242 and 244 is an integer number N as shown explicitly in FIG. 5. For each symbol period the integration operation is set to zero (dumped) and then each despread N chip signal level is accumulated over a symbol period to generate the detected symbol signal. Since the operations following the integrate & dump operations are performed at the symbol rate versus the chip rate, the switches following the integrate & dump circuitry operating at a symbol period (Ts) are shown. Hence, each symbol signal output is at a multiple of the symbol period, represented by kTs in FIG. 5; where k is an integer from 1 to the number of total differential received symbols. After each symbol integration, the output accumulated inphase and quadrature symbol signals is sent to the differential BPSK (DBPSK) detector consisting of elements 246, 248, 250, 252, and 254. Integrate & dump 242 generates the inphase symbols and integrate & dump 244 generates the quadrature symbol signals for the DBPSK detector. For a coherent receiver using BPSK modulation signal, only the integrate & dump 242 is required. For coherent demodulation of quadrature modulation signals, integrate & dump 242 and 244 are required.

Differential detection of the DBPSK symbols for each Rake tap is performed to remove the carrier phase error θ for the noncoherent receiver. Multiplier 250 multiplies the output of integrator 242 with the output of symbol delay circuit 246 to generate the differential decoded I symbol signal. Multiplier 252 multiplies the output of integrator 244 with the output of symbol delay circuit 248 to generate the differential decoded Q symbol signal. A summer 254 receives and sums the outputs of multipliers 250 and 252 to generate the differential decoded symbol. This structure is a standard DBPSK implementation. The differential decoded symbol output for each Tap 1 through M is sent of the Rake tap symbol alignment and combining circuit 256.

Figure 6:
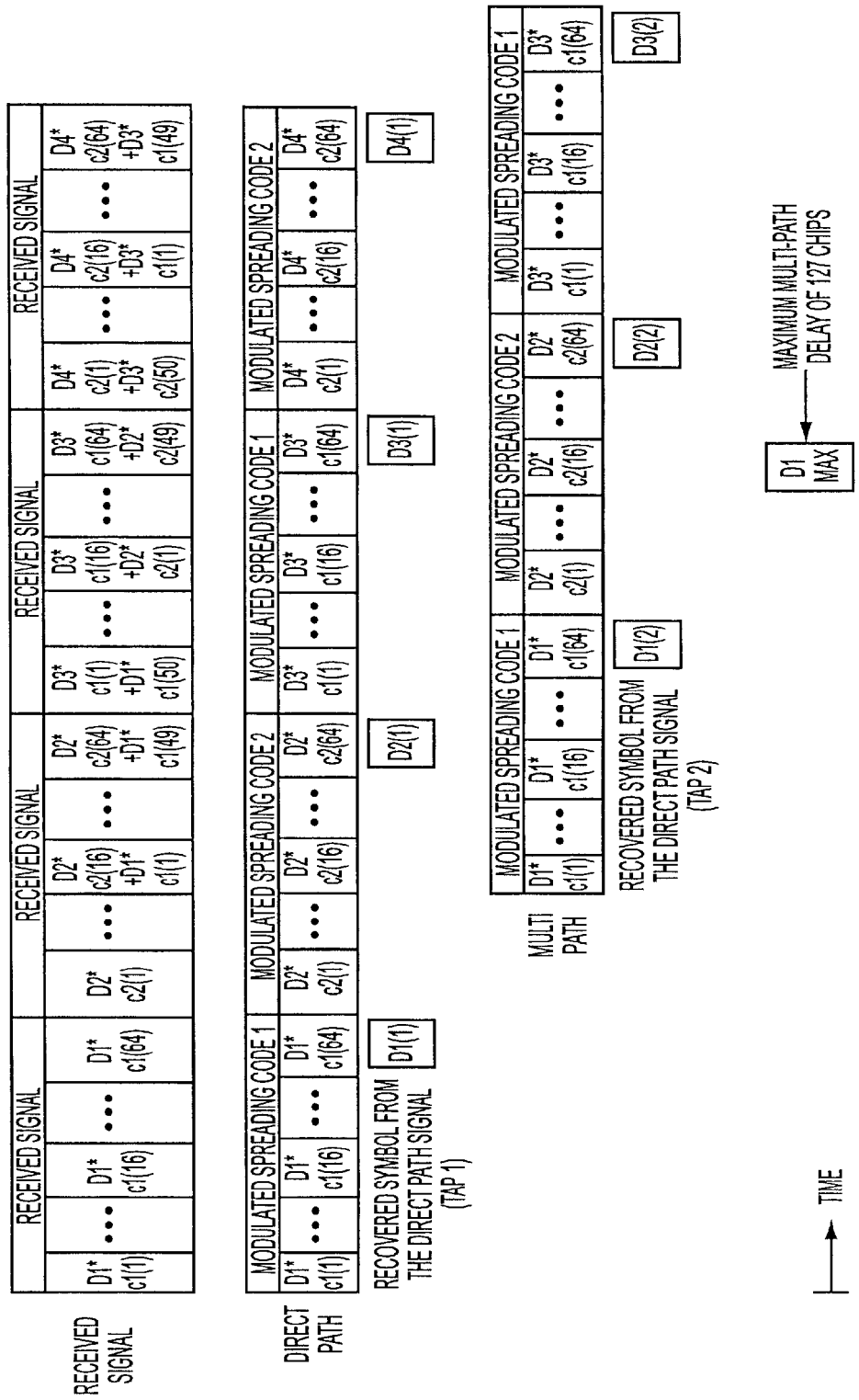
FIG. 6 is a signal diagram illustrating a data signal spread by a spreading code including concatenated spreading sequences in accordance with an embodiment of the present invention to produce a direct path signal and a multi-path signal generated by the communications channel having a 79 chip delay with respect to the direct path signal, as well as a recovered symbols out of the differential detector for each of the two Rake Taps for BPSK data modulation.

FIG. 6 shows the recovered symbols for a direct and multi-path signal assigned to Rake Tap 1 and 2, respectively. The differential decoded symbol 1 for tap 1 is defined by D1(1), symbol 1 for tap 2 is defined by D1(2), symbol 2 for tap 1 is defined by D2(1), symbol 2 for tap 2 is defined by D2(2), and so on. For higher order modulations, such as DQPSK, the differential detector needs to be modified according to existing or modified architectures known by one skilled in the art. For coherent demodulation of binary or quadrature modulated signals, differential detection can still be implemented. For a coherent binary modulated signal, only the differential decoded 1 symbol signal (elements 246 and 250) is required to obtain the differential decoded symbol. For a coherent quadrature modulated signal, two differential decoded symbols are received versus one for the binary case. The differential decoded 1 symbol signal (elements 246 and 250) is required to obtain one of the differential decoded symbols, defined as the I symbol. The differential decoded Q symbol signal (elements 248 and 252) is required to obtain the other differential decoded symbols, defined as the Q symbol. Each I and Q symbols are sent to the Rake tap symbol alignment and combining circuit 256.

Figure 7:
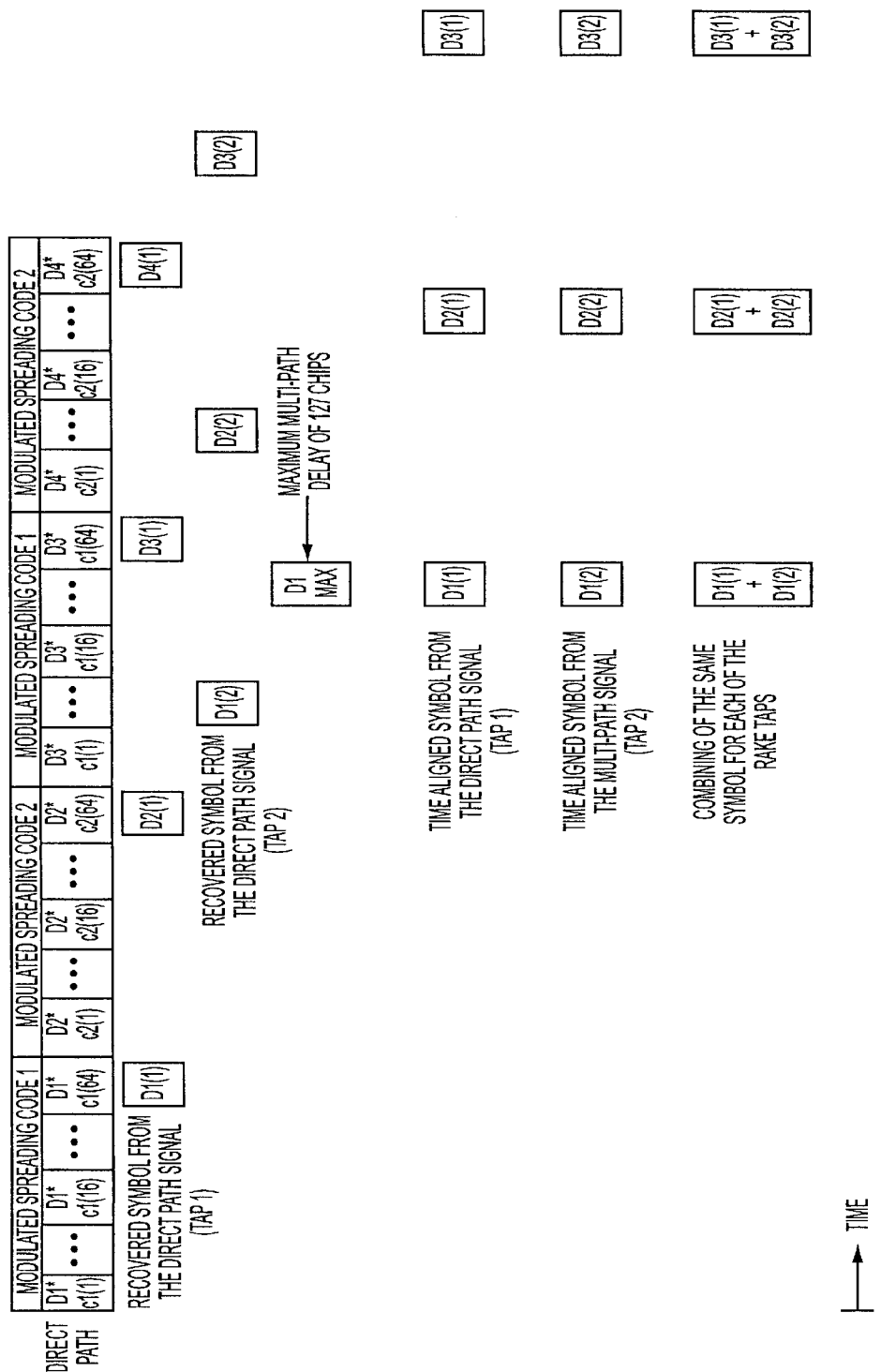
FIG. 7 is a signal diagram illustrating the Rake time alignment and combining of the same symbol for each Rake Tap for the direct and multi-path signal given in FIG. 6.

The Rake tap symbol alignment and combining circuit 256 receives the differential decoded symbols for each Rake tap 1 through M. Specifically, the outputs from the summers 254 of each circuit 236-1 through 236-M are input to the circuit 256, which time aligns the same symbol detected on each Rake tap and then adds all the symbols for each Rake tap together. FIG. 6 shows that the recovered symbols into this the Rake tap symbol alignment and combining circuit 256 for two Rake taps are not aligned in time. For the two 64 chip concatenated spreading sequences given in this example, the maximum multi-path delay is 127 chips, as explained below. To ensure proper time align for all the possible multi-path delays, the symbols for each Rake Tap are delayed to the maximum multi-path delayed point for each symbol detection point as shown in FIG. 7. The time aligned symbols are then added together to maximize the symbol detection level. FIG. 7 shows the addition of the two Rake taps for the specific example. For the general case, the Rake combining output for the Lth symbol symbols with M Rake taps is DL(1)+DL(2)+DL(3)+. . . +DL(M). The same Rake tap symbol alignment and combining circuit 256 is used for a coherent binary data modulated signal. For a coherent quadrature modulated signal, two Rake tap symbol alignment and combining circuit are required. One is applied to the I symbol for each Rake tap and the other is used for the Q symbol for each Rake taps.

The data detection circuit 258 determines if the combined symbol is greater than or less than zero and maps each condition into a logic value of 0 or 1. The condition that the combined symbol is equal to zero is mapped into one of these logic levels. The data detection circuit 258 thus outputs the recovered data bits $b_k$. For coherent binary modulated signal, the same data detection circuit is used to recover the data bits. For a coherent quadrature modulated signal, two data detection circuits are required to recover the I and Q data bits.

As described in more detail below, the system 100 shown in FIG. 4 can be configured to use concatenated spreading sequences with low autocorrelation and cross-correlation sidelobe properties to enable a transmitter to increase the multi-path delay spread and data rate by removing the one-to-one relationship between the multi-path delay spread and the data period discussed in the Background section above. For example, as can be appreciated from the example shown in FIG. 3 and discussed in the Background section, conventional techniques are unable to obtain a multi-path delay spread of 128 chips with data period of 64 chips. However, this relationship can be achieved by concatenating two repetitive spreading sequences. This concatenation of two spread sequences enables the system 100 and hence, the transmitter, to double the data rate over previous techniques, while obtaining the same multi-path delay spread without changing the modulation format.

Figure 8:
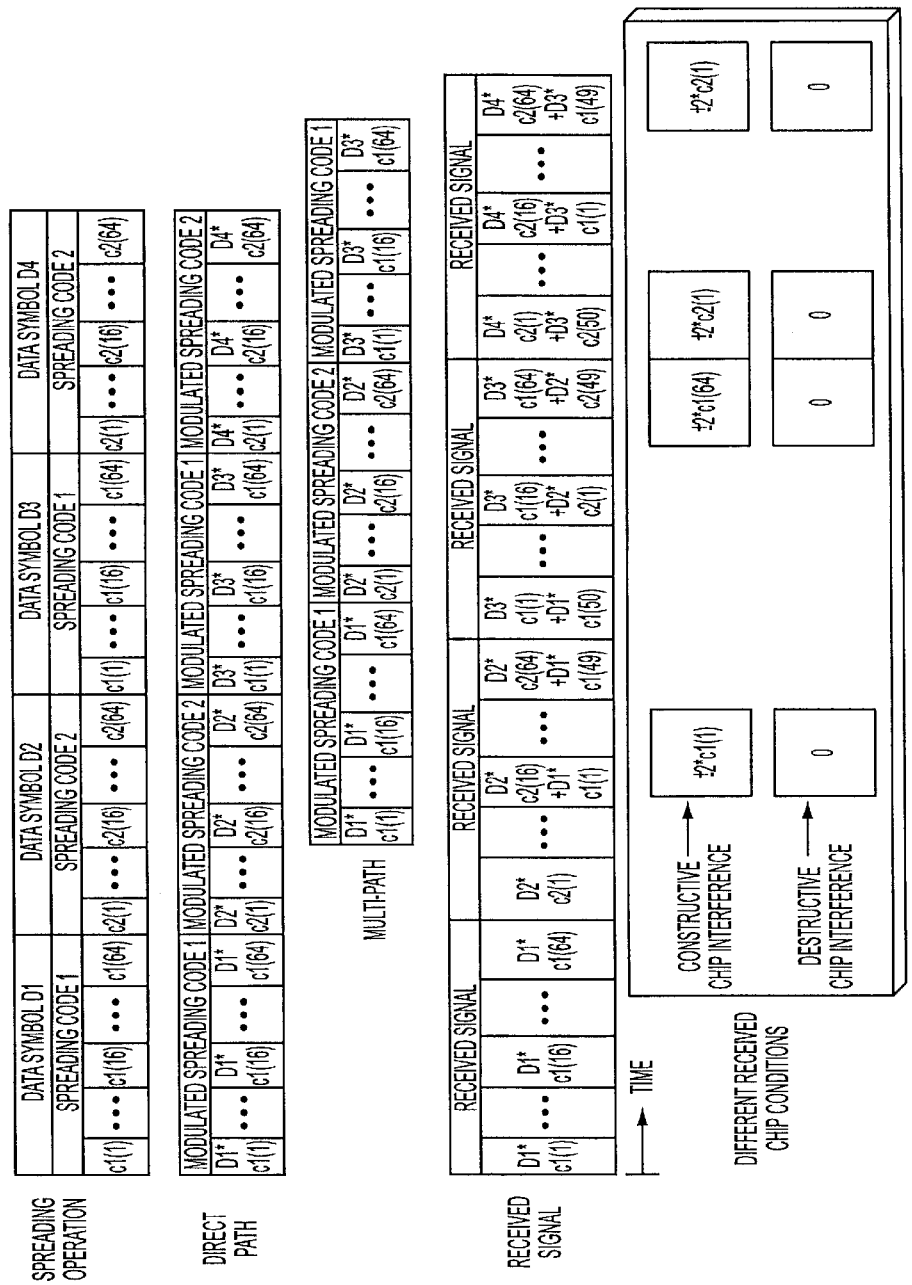
FIG. 8 is a signal diagram illustrating a data signal spread by a spreading code including concatenated spreading sequences in accordance with an embodiment of the present invention to produce a direct path signal and a multi-path signal generated by the communications channel having a 79 chip delay with respect to the direct path signal, as well as a received signal which is a combination of the direct path and multi-path signals, and an example of constructive and destructive chip interference for BPSK data modulation.

FIG. 8 illustrates this modulation technique using concatenated spreading sequences of 64 chips long. As indicated, odd data bits (i.e., data symbol D1) are multiplied by spread code 1, while even data bits (i.e., data symbol D2) are multiplied by spreading code 2. The spreading codes are repeated in the same order to maintain good autocorrelation and cross-correlation properties across the desired ±128 chip multi-path delay spread window. Specifically, FIG. 8 illustrates a direct signal path created by this technique, along with a multi-path signal generated by the communications channel, with delay of 79 chips with respect to the direct signal. The received signal is the combination of the direct and multi-path signals, which introduces both constructive and destructive chip interference as indicated.

Figure 1:
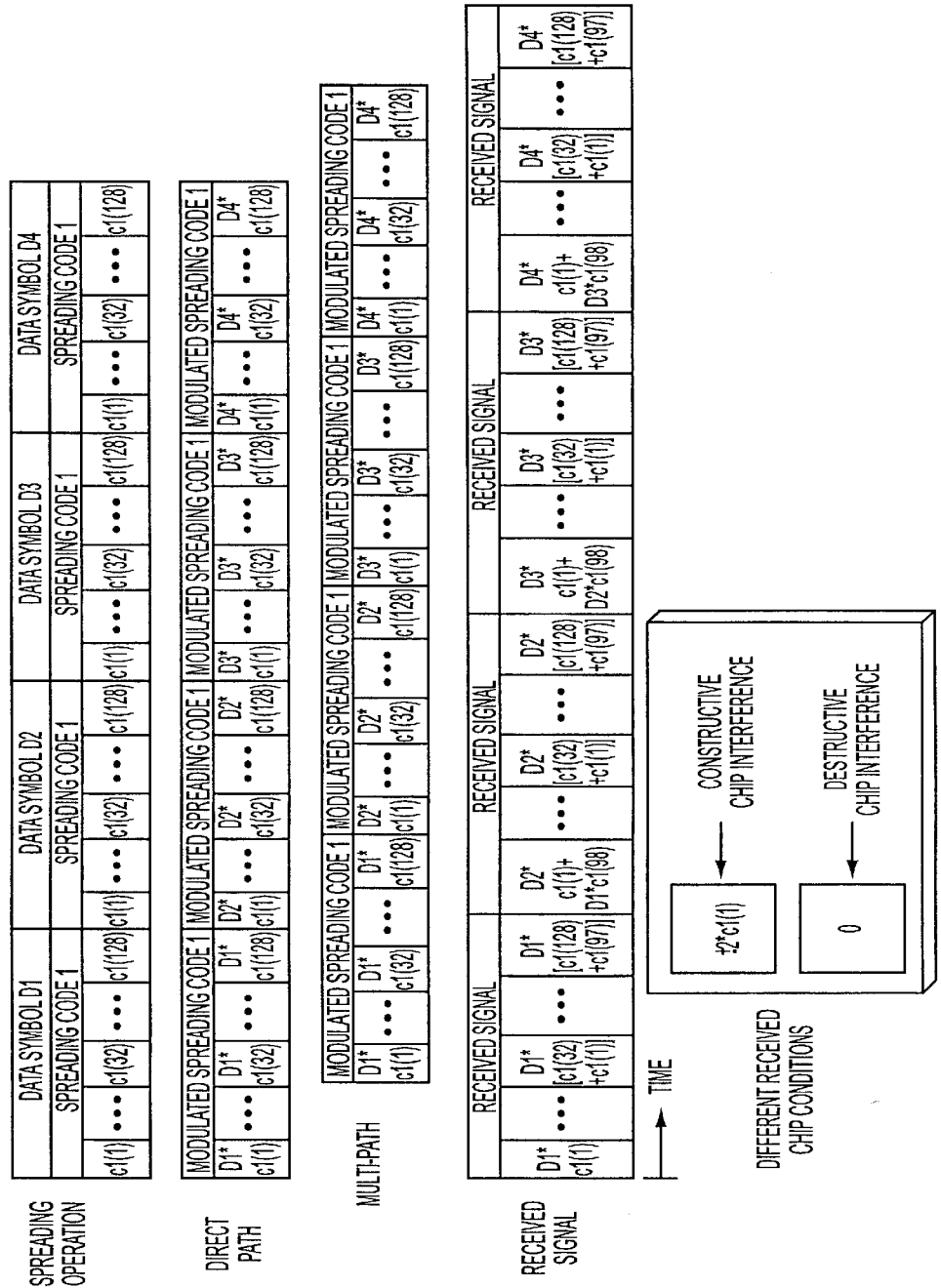
FIG. 1 is a signal diagram illustrating a data signal spread by a spreading code in accordance with a known technique to produce a direct path signal and a multi-path signal generated by the communications channel having a 31 chip delay with respect to the direct path signal, as well as a received signal which is a combination of the direct path and multi-path signals, and an example of constructive and destructive chip interference for BPSK data modulation.
Figure 2:
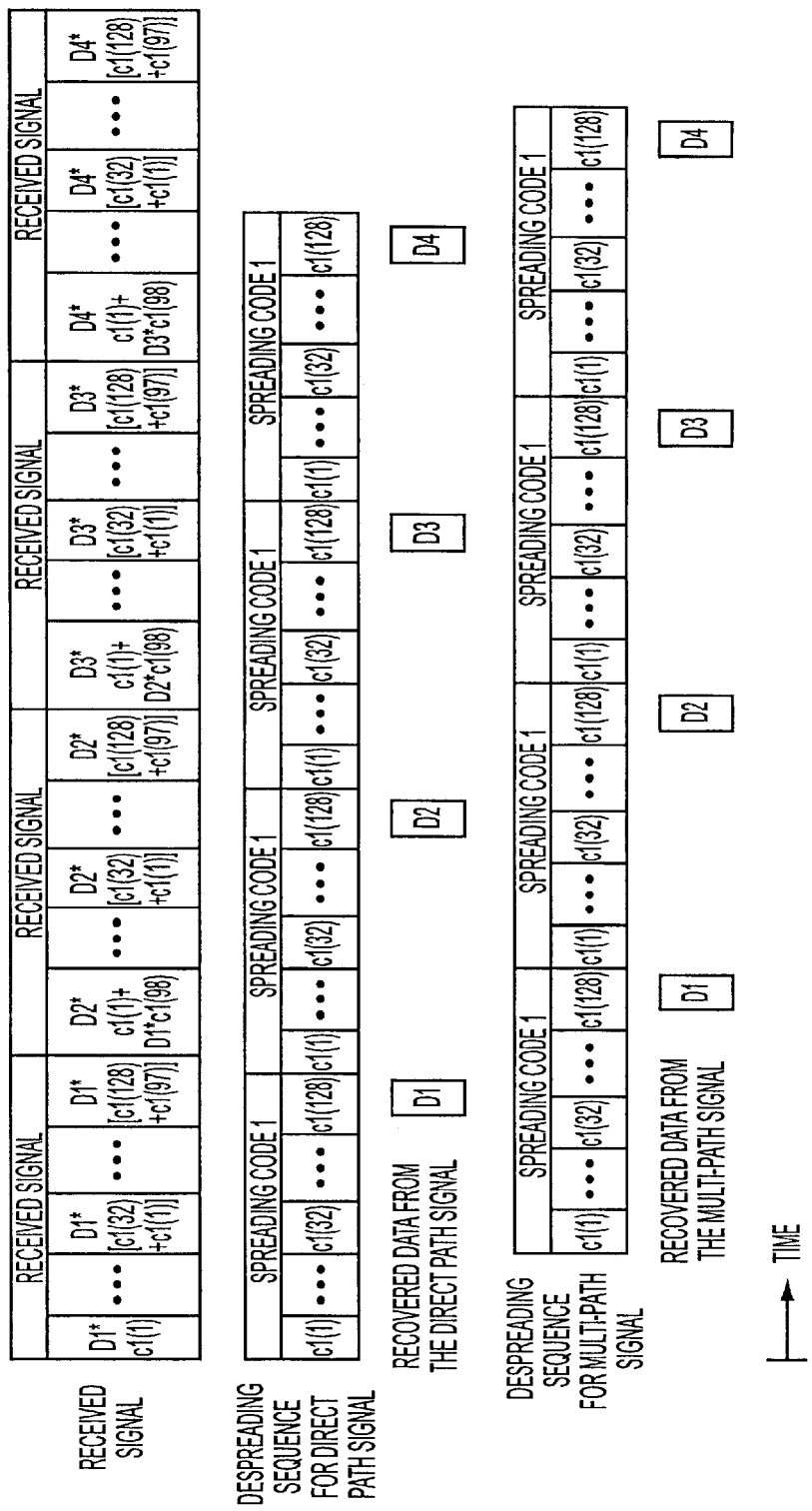
FIG. 2 is a signal diagram illustrating the received signal shown in FIG. 1 being despread by despreading sequences for the direct path signal and multi-path signal to recover the data signal in accordance with a known Rake demodulator technique.

As with the technique discussed above with respect to FIG. 1 for a single repetitive spreading code, chip interference is introduced by the multi-path signal. As with the single repetitive spreading code, a suitable spreading code enables a receiver to recover the original signal. Since two spreading codes are used in the technique shown in FIG. 8, codes are selected with low sidelobe levels for the autocorrelation and cross-correlation function. By using a Rake receiver structure similar to that used to recover the signal shown in FIG. 2 for the single repetitive spreading code, a receiver is able to recover both the direct and multi-path signals shown in FIG. 8 by despreading with two properly time aligned spreading sequence consisting of the two concatenated 64 chip spreading code.

Figure 3:
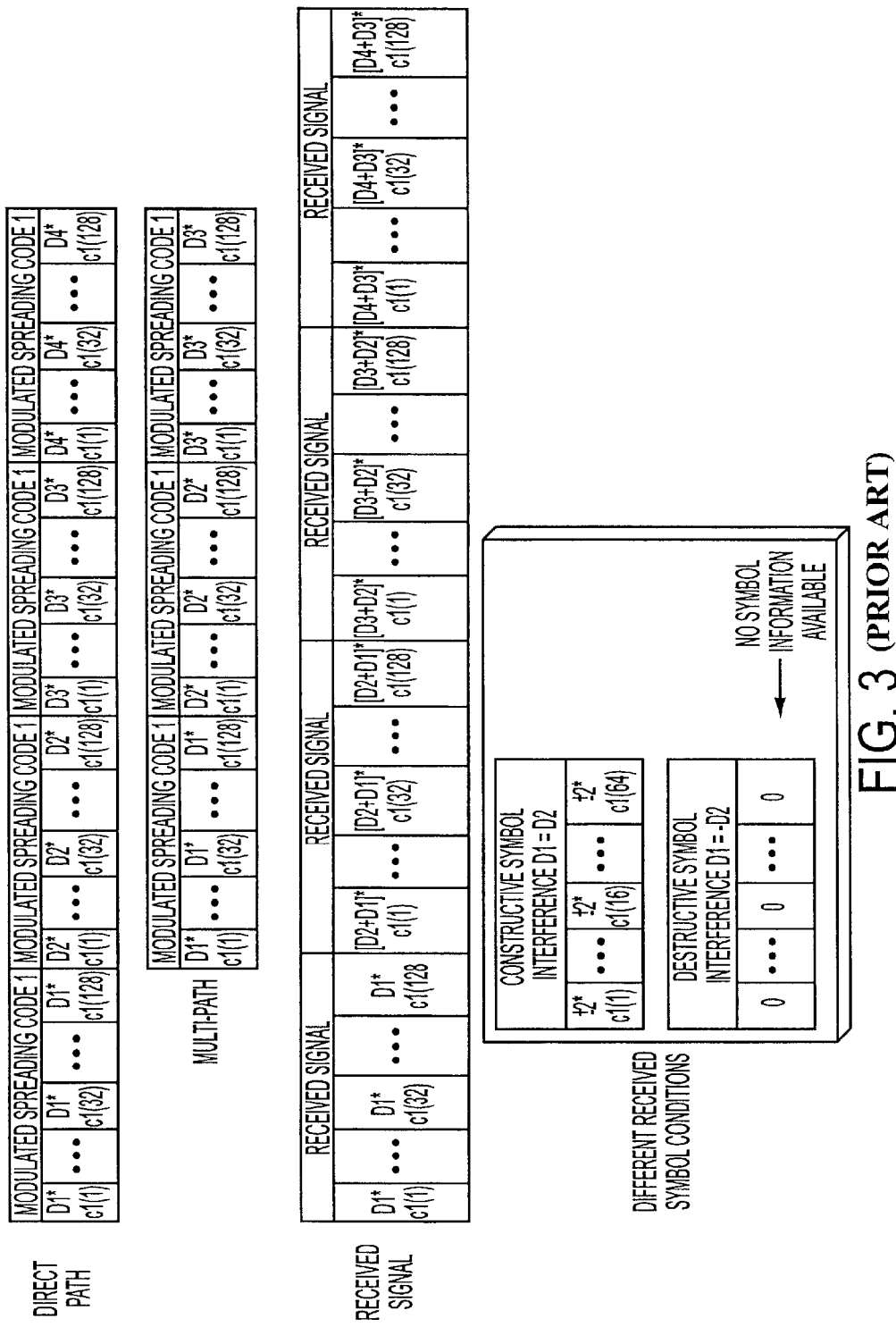
FIG. 3 is a signal diagram illustrating a direct path signal as shown in FIG. 1 and a multi-path signal as shown in FIG. 1 but having a 128 chip delay with respect to the direct path signal, as well as a received signal which is a combination of the direct path and multi-path signals and an example of constructive and destructive symbol interference for BPSK data modulation.
Figure 9:
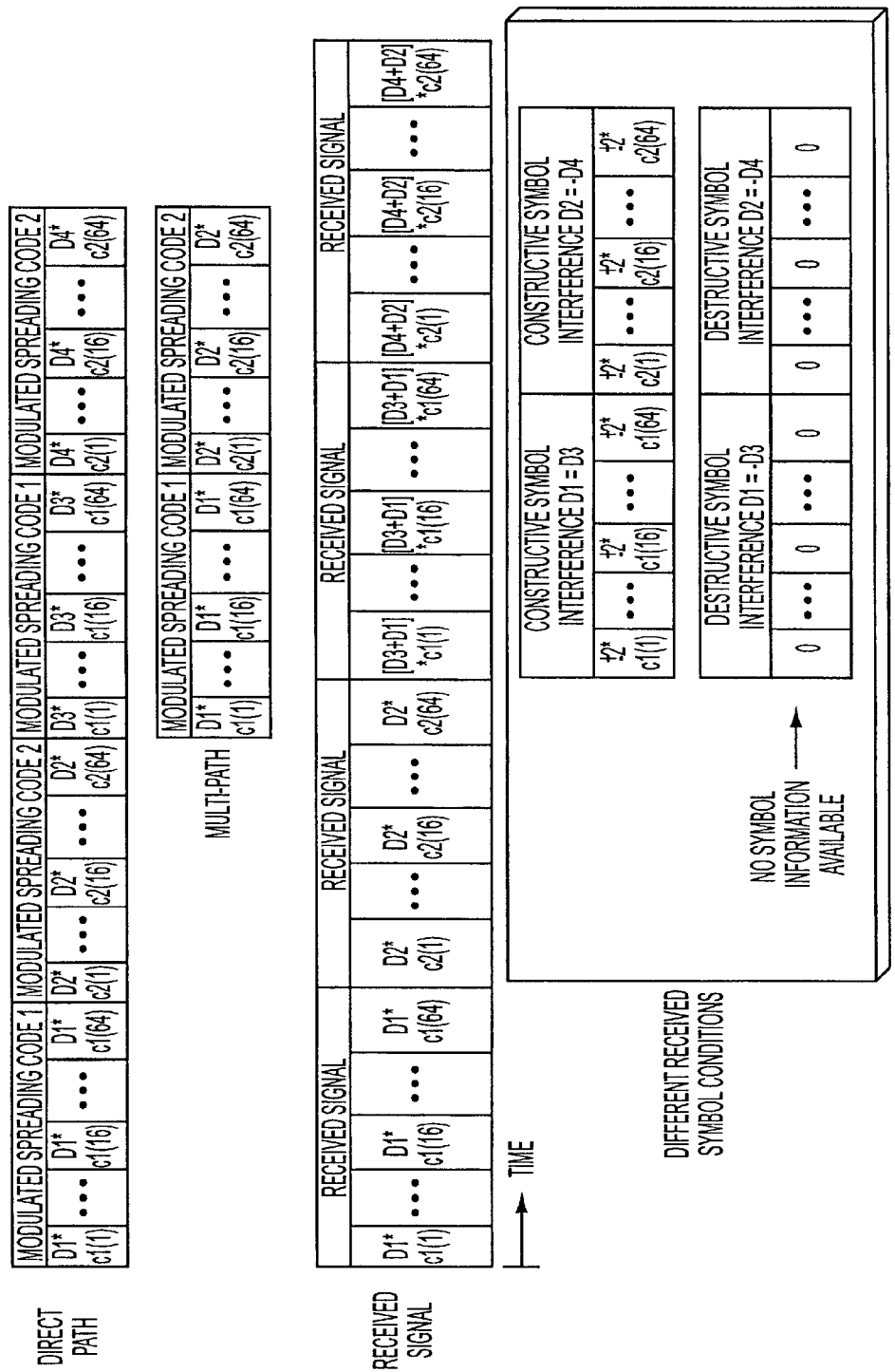
FIG. 9 is a signal diagram illustrating a direct path signal as shown in FIG. 6 and a multi-path signal as shown in FIG. 6 but having a 128 chip delay with respect to the direct path signal, as well as a received signal which is a combination of the direct path and multi-path signals and an example of constructive and destructive symbol interference for BPSK data modulation.

FIG. 9 illustrates an example in which the multi-path delay spread for the two concatenated spreading sequence example shown in FIG. 8 is increased to 128 chips. As indicated, instead of the multi-path signal introducing chip interference, the multi-path signal introduces symbol interference like that introduced with the single 128 chip spreading sequence as shown in FIG. 3. The symbol interference extends across an entire spreading sequence as shown in FIG. 9. For reasons discussed above with regard to FIG. 3, recovery of the symbol for this condition can be impossible when destructive interference occurs between the data symbols, for example, between D1 and D2. However, as the multi-path delay is increased beyond 128 chips, the recovery of data is again possible. Accordingly, to avoid the condition in which destructive interference renders data recovery impossible, the multi-path delay spread is limited to the less than the maximum length of the spreading code. The two 64 chip concatenated spreading sequences are thus able to provide the same multi-path delay spread as the single 128 chip spreading sequence, while also enables the transmitter to double the data rate.

Another example in which a direct sequence spreading approach according to an embodiment of the present invention uses concatenated spreading sequences to remove the one-to-one relationship between the repetitive spreading code length and maximum multi-path delay spread will now be described with reference to FIGS. 10 and 11. This approach enables the system 100 and hence, a transceiver, to achieve higher data rates for a fixed multi-path delay spread requirement. As with the techniques discussed above, low autocorrelation and cross-correlation sidelobe levels for each of the spreading sequences are preferable in order to be able to concatenate the spreading sequences together to form a long spreading sequence.

Figure 10:
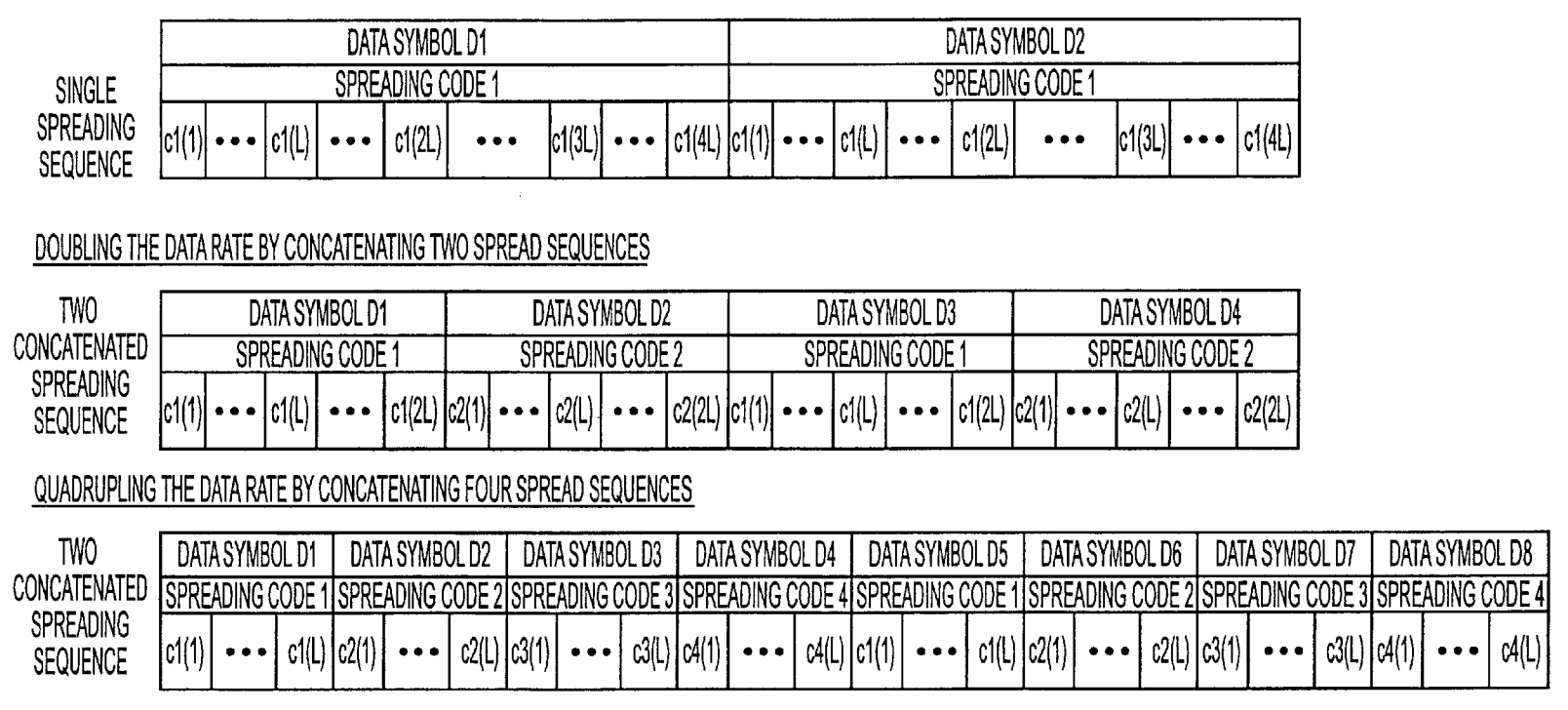

FIG. 10 illustrates an example of the manner in which the data rate can be doubled and quadrupled for a fixed multi-path delay spread using concatenated spreading sequences. As indicated in the "Single Spreading Sequence" example, each data symbol D1 and D2 is spread by a single spreading code of length 4L. The concatenated spreading sequences which consists of two 2L-length and four L-length spreading sequences. Also, although the figure shows only an even number of concatenated spreading sequences (i.e., four), an odd number (e.g., three, five and so on) of concatenated spreading sequences can also be used.

As further shown in FIG. 10, the data rate can be doubled by spreading each of the data symbols D1 and D2 with only one of the two concatenated 2L-length spreading sequences, and can be quadrupled by spreading each of the data symbols D1 and D2 with only one of the four L-length spreading sequences. It is noted that FIG. 10 shows that the same concatenated codes are repeated in the same order to implement the long spreading sequence in order to obtain a 4L distance between each of the repeated spreading sequences. This approach minimizes the number of spreading sequences required to implement the concatenated spread sequence structure. However, it is not necessary for the same concatenated codes to be repeated in the same order in this manner if additional spreading code sequences can be selected in the concatenation process.

Figure 11:
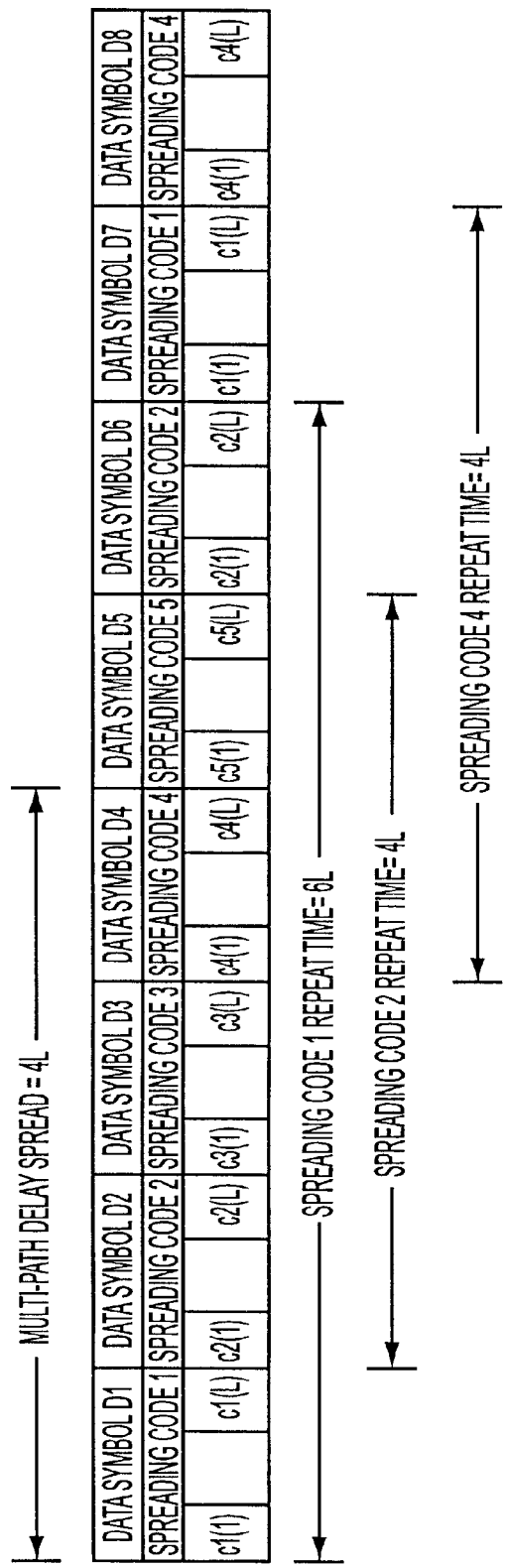
FIG. 11 is a signal diagram illustrating an example of a data signal being spread by a signal spreading sequence including four concatenated sequences using five different spreading sequences according to an embodiment of the present invention.

For example, FIG. 11 shows a four concatenated spreading sequence structure implemented using five different spreading sequences. In this arrangement, the primary constraint to meet the desired multi-path delay spread of 4L chips is to insure that no spread sequence repeats within this parameter of 4L chips. Specifically, FIG. 11 shows that the repeat time between each spread code is equal to or greater than the multi-path delay spread of 4L chips.

Although the techniques discussed above with respect to FIGS. 8–11 relate to baseband data with biphase shift keying (BPSK) data modulation, concatenated spreading sequences can be applied to other modulation such as quadrature phase shift keying (QPSK), offset quadrature phase shift keying (OQPSK), minimum shift keying (MSK), gaussian minimum shift keying (GMSK), and other advanced modulation schemes using the same basic concept. Also, coherent or noncoherent communications systems can apply the concatenated spreading sequence approach discussed above.

In summary, the direct sequence spreading techniques according to the embodiments described above with respect to FIGS. 8–11 use concatenated spreading sequences to remove the one-to-one relationship between the repetitive spreading code length and maximum multi-path delay spread. Low autocorrelation and cross-correlation sidelobe properties of the spreading sequences enable the codes to be concatenated together to form an effectively longer spreading sequence with respect to multi-path delay spread. Each short spreading sequence making up the longer concatenated spreading sequence is modulated by the data information, thus enabling a transmitter to increase the data rate for a given multi-path delay spread. By modulating across the entire spreading sequence, the autocorrelation and cross-correlation properties of the individual spreading sequences are preserved.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for modulating a data signal including a plurality of data symbols, comprising:
   generating spreading code sequences;
   creating a plurality of concatenated spreading sequences, each comprising a plurality of said spreading code sequences concatenated together; and
   modulating each of said data symbols with a respective one of said concatenated spreading sequences to produce a direct path signal including a plurality of modulated data signals.

2. A method as claimed in claim 1, wherein:
   each of said concatenated spreading sequences has a length no greater than a predetermined maximum length; and
   a length of one of said concatenated spreading sequence sets a maximum delay spread capability in a RAKE receiver to recover both the direct signal and a multi-path signal without experiencing total destructive interference.

3. A method as claimed in claim 2, wherein:
   said maximum delay spread capability is not limited by a number of chips in any of said spreading code sequences.

4. A method as claimed in claim 3, wherein:
   said number of chips in said any spreading code sequence is equal to L, and said maximum delay spread capability is greater than L.

5. A method as claimed in claim 1, further comprising:
   transmitting said direct path signal at a data rate; and
   increasing said data rate at which said direct path signal is transmitted without decreasing a length of delay spread.

6. A method as claimed in claim 1, wherein:
   at least one of said concatenated spreading sequences comprises at least one of said spreading code sequences that differs from any of said spreading code sequences in at least one other of said concatenated spreading sequences.

7. A method as claimed in claim 1, further comprising:
   transmitting said direct path signal at a data rate from a node of an ad-hoc communications network.

8. A system for modulating a data signal including a plurality of data symbols, comprising:
   a spreading code generator, adapted to generate spreading code sequences;
   a concatenating circuit, adapted to create a plurality of concatenated spreading sequences, each comprising a plurality of said spreading code sequences concatenated together; and
   a modulator, adapted to modulate each of said data symbols with a respective one of said concatenated spreading sequences to produce a direct path signal including a plurality of modulated data signals.

9. A system as claimed in claim 8, wherein:
   each of said concatenated spreading sequences has a length no greater than a predetermined maximum length; and
   a length of one of said concatenated spreading sequence sets a maximum delay spread capability in a RAKE receiver to recover both the direct signal and a multi-path signal without experiencing total destructive interference.

10. A system as claimed in claim 9, wherein:
    said maximum delay spread capability is not limited by a number of chips in any of said spreading code sequences.

11. A system as claimed in claim 10, wherein:
    said number of chips in said any spreading code sequence is equal to L, and said maximum delay spread capability is greater than L.

12. A system as claimed in claim 8, further comprising:
    a transmitter, adapted to transmit said direct path signal at a data rate, and which is further adapted to increase said data rate at which said direct path signal is transmitted without decreasing a length of delay spread.

13. A system as claimed in claim 12, wherein:
    said transmitter is employed in a node of an ad-hoc communications network.

14. A system as claimed in claim 8, wherein:
    at least one of said concatenated spreading sequences comprises at least one of said spreading code sequences that differs from any of said spreading code sequences in at least one other of said concatenated spreading sequences.

* * * * *